(12) United States Patent
Nilsson et al.

(10) Patent No.: US 12,194,778 B2
(45) Date of Patent: Jan. 14, 2025

(54) WHEEL RIM STRUCTURE FOR MOTOR-VEHICLES

(71) Applicant: TRELLEBORG WHEEL SYSTEMS ITALIA S.P.A., Tivoli-Villa Adriana (IT)

(72) Inventors: Håkan Nilsson, Sävsjö (SE); Sergejs Gorcinskis, Liepaja (LV)

(73) Assignee: TRELLEBORG WHEEL SYSTEMS ITALIA S.P.A., Tivoli-Villa Adriana (IT)

( * ) Notice: Subject to any disclaimer, the term of this patent is extended or adjusted under 35 U.S.C. 154(b) by 677 days.

(21) Appl. No.: 17/428,485

(22) PCT Filed: Jan. 16, 2020

(86) PCT No.: PCT/IB2020/050351
§ 371 (c)(1),
(2) Date: Aug. 4, 2021

(87) PCT Pub. No.: WO2020/161550
PCT Pub. Date: Aug. 13, 2020

(65) Prior Publication Data
US 2022/0144013 A1 May 12, 2022

(30) Foreign Application Priority Data
Feb. 6, 2019 (IT) .................. 102019000001733

(51) Int. Cl.
*B60B 21/02* (2006.01)
*B60B 3/02* (2006.01)
*B60B 21/10* (2006.01)

(52) U.S. Cl.
CPC .......... *B60B 21/026* (2013.01); *B60B 21/102* (2013.01); *B60B 21/104* (2013.01);
(Continued)

(58) Field of Classification Search
CPC .... B60B 21/026; B60B 21/102; B60B 21/108
See application file for complete search history.

(56) References Cited

U.S. PATENT DOCUMENTS 5,318,088 A    6/1994  Billieres
6,474,385 B1*  11/2002 Bonning ............... B60B 21/028
                                                  301/63.101
(Continued)

FOREIGN PATENT DOCUMENTS

EP    2193931 A1    6/2010
GB    2431141 A     4/2007
(Continued)

OTHER PUBLICATIONS

Search Report issued in corresponding Russian Application No. 2021126067, mailed on May 3, 2023 (4 pages).
(Continued)

*Primary Examiner* — Jason R Bellinger
(74) *Attorney, Agent, or Firm* — Bookoff McAndrews, PLLC

(57) ABSTRACT

A wheel rim that includes a peripheral structure for receiving a tire, and a central structure for coupling with a hub of the vehicle. The peripheral structure includes, for each side of the wheel rim, a peripheral flange, a connecting wall on which the bead of the tire rests, and a connecting part. The peripheral structure includes a central well. The connecting part includes a first curved region which joins the central well, and a second curved region between the first curved region and the connecting wall. The second curved region has a convex profile from the side of the wheel rim with the tire, and includes a first curved surface joined to the connecting wall with a first radius of curvature, and a second curved surface between the first curved surface and the first
(Continued)

curved region, with a second radius of curvature different from the first radius of curvature.

9 Claims, 7 Drawing Sheets

(52) U.S. Cl.
CPC ........... *B60B 3/02* (2013.01); *B60B 2900/115* (2013.01); *B60B 2900/311* (2013.01); *B60B 2900/313* (2013.01)

(56) References Cited

U.S. PATENT DOCUMENTS

| | | | |
|---|---|---|---|
| 9,662,935 B2 * | 5/2017 | Jensen | ................. B60B 21/102 |
| 2011/0298271 A1 | 12/2011 | Cragg | |
| 2014/0300176 A1 | 10/2014 | Buchel | |

FOREIGN PATENT DOCUMENTS

| | | | |
|---|---|---|---|
| GB | 2539032 | A | 12/2016 |
| RU | 2476326 | C1 | 2/2023 |

OTHER PUBLICATIONS

International Search Report and Written Opinion issued in related International Patent Application No. PCT/IB2020/050351, issued on Sep. 29, 2020 (9 pages).

* cited by examiner

WHEEL RIM STRUCTURE FOR MOTOR-VEHICLES

CROSS-REFERENCE TO RELATED APPLICATION(S)

This patent application is the national stage entry of International Patent Application No. PCT/IB2020/050351, filed on Jan. 16, 2020, which claims the benefit of priority to Italian Patent Application No. 102019000001733, filed on Feb. 6, 2019.

FIELD

The present disclosure concerns in general a wheel rim structure for motor-vehicles, in particular but not exclusively a wheel rim structure for an agricultural machine, a wheeled construction machine or similar vehicles.

BACKGROUND

In the field of agricultural machines, wheel structures are known which comprise a wheel rim with a substantially circular shape. This wheel rim is provided with outer parts and inner parts, with reference to a centre-line plane, which each provide a flange for a respective bead of the tire to be fitted on said wheel rim. A respective frustoconical connecting surface or wall departs, in the direction of the centre-line plane, from each outer and inner part. Both the frustoconical connecting surfaces or walls therefore extend axially towards a central portion, where a so-called central circumferential well is obtained.

The flange for the bead of the tire, and typically at least a part of the frustoconical connecting surface or wall, together provide a seat for housing the tire as a whole on the wheel rim. The frustoconical connecting surface or wall is usually adjacent to a lateral containment wall which extends circumferentially towards, and adjoins, the central part of the outer edge of the wheel rim.

These wheel rims of a known type are designed for fitting both tires provided with inner tube and, more specifically, tires of the so-called tubeless type. Even more specifically, these wheel rims of a known type are often equipped with high flotation tires for agricultural or building site use. These wheel rims of a known type are illustrated, for example, in the document EP-A-2193931.

A drawback of these wheel rims of a known type consists in the fact that, considering the heavy duty use to which they are normally subjected, their duration can be insufficient. This is due mainly to the structural stresses that occur in the area of the circumferential profile of the wheel rim whose lateral parts, which support the tire, are adjacent to the central region, which is integral with the vehicle hub fixing wall. These stresses can result in deformations and/or breakages and, more generally, premature failure of the wheel rim.

SUMMARY

The object of the present disclosure is therefore to provide a wheel rim structure for motor-vehicles which is capable of solving the above-mentioned drawbacks of the prior art in an extremely simple, inexpensive and particularly functional manner.

In detail, an object of the present disclosure is to provide a wheel rim structure for motor-vehicles which minimizes, compared to similar wheel rims of a known type, the structural tensions that occur in the area of the circumferential profile of the wheel rim, the lateral parts of which join to the central region. Experimental tests on the wheel rim according to the present disclosure have in fact shown that the structural problems in this area of the circumferential profile of the wheel rim are considerably reduced.

Another object of the present disclosure is to provide a wheel rim structure for motor-vehicles that reduces the tire inflation time, again compared to similar wheel rims of a known type.

A further object of the present disclosure is to provide a wheel rim structure for motor-vehicles that is particularly simple to manufacture.

These and other objects according to the present disclosure are achieved by providing a wheel rim structure for motor-vehicles as described herein.

Further features of the disclosure are highlighted by the dependent claims, which form an integral part of the present description.

DESCRIPTION OF THE DRAWINGS

The features and advantages of a wheel rim structure for motor-vehicles according to the present disclosure will become clearer from the following description, provided by way of non-limiting example, referring to the attached schematic drawings in which.

DETAILED DESCRIPTION

Figure 4:
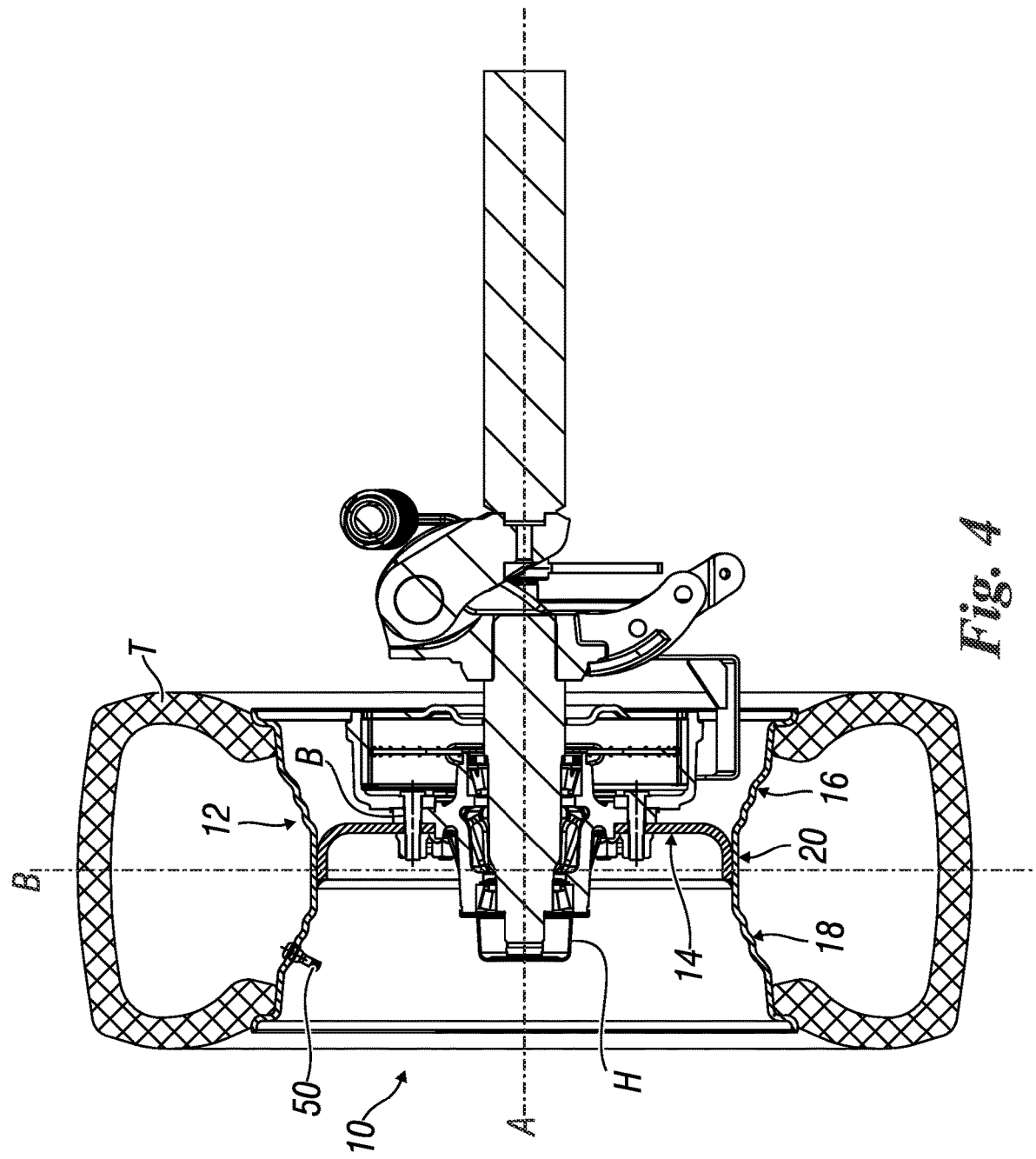
FIG. 4 is another sectional view of the wheel rim structure of FIG. 1, provided with tire and fitted on the hub of a motor-vehicle.

With reference to the figures, an embodiment of the wheel rim structure for motor-vehicles according to the present disclosure is shown, indicated as a whole by the reference number 10. The wheel rim 10 comprises a peripheral structure 12 with substantially circular shape. This peripheral structure 12 extends circumferentially around a first predefined axis A, which substantially coincides with the axis of the hub H (FIG. 4) of the motor-vehicle when the wheel rim 10 is in the configuration mounted on said hub H. As shown in FIG. 4, this peripheral structure 12 is the part of the wheel rim 10 that is designed to receive a tire T. A valve 50 for inflation of the tire T can also be fitted on the peripheral structure 12, in a per se known manner.

The wheel rim 10 further comprises a central structure 14, internally integral with the peripheral structure 12 and provided with means for coupling with the hub H of the motor-vehicle. The coupling of the wheel rim 10 with the hub H of the motor-vehicle is typically carried out in the direction of the above-mentioned first axis A. The coupling means provided on the central structure 14, in a per se known manner, can consist of a central through hole, into which the terminal end of the hub H is inserted, and of a plurality of through holes arranged circumferentially around the central through hole, which allow reversible fixing, by means of conventional bolts B, of the wheel rim 10 on the hub H.

Figure 1:
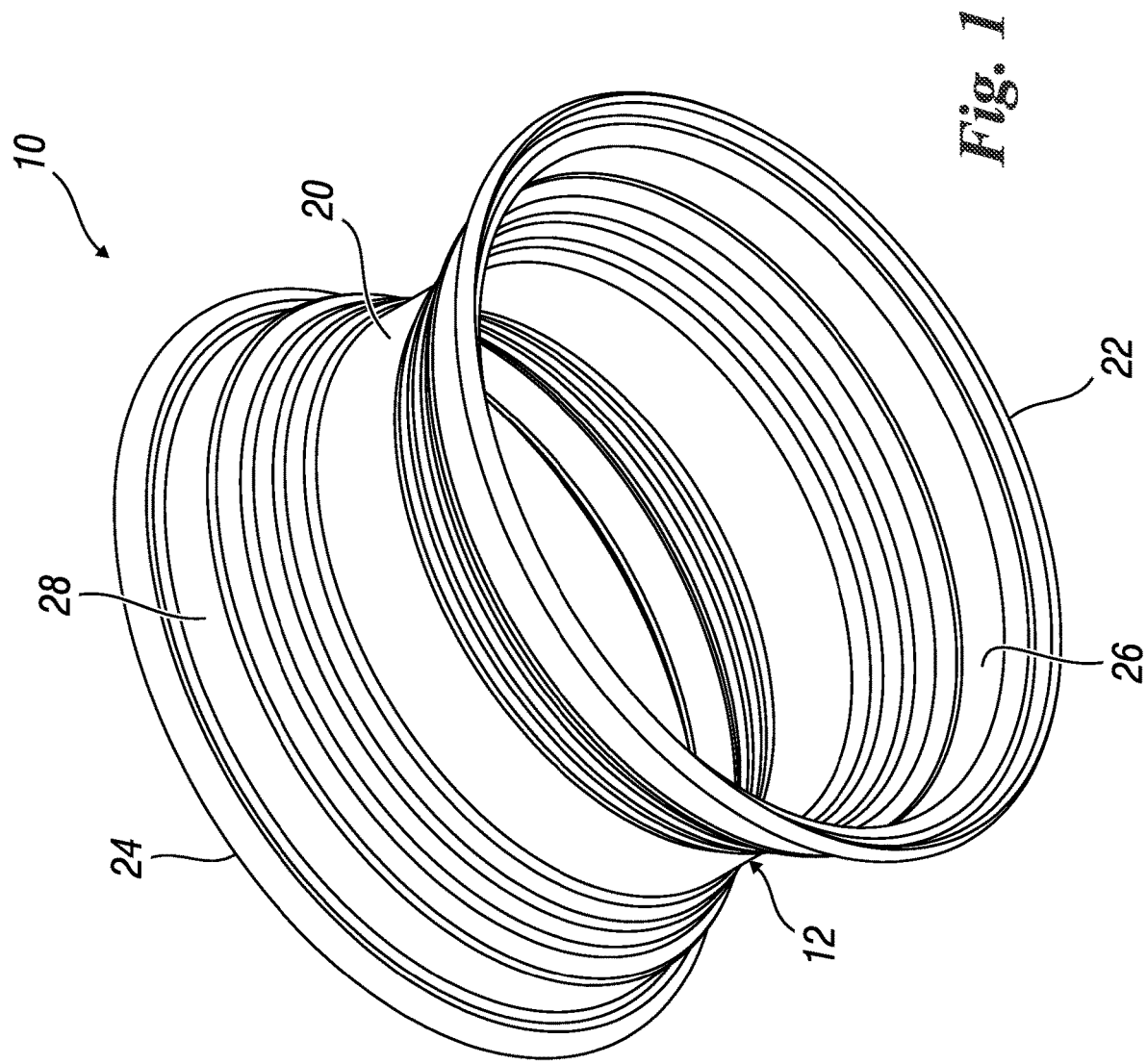
FIG. 1 is a perspective view of an embodiment of the wheel rim structure for motor-vehicles according to the present disclosure.
Figure 2:
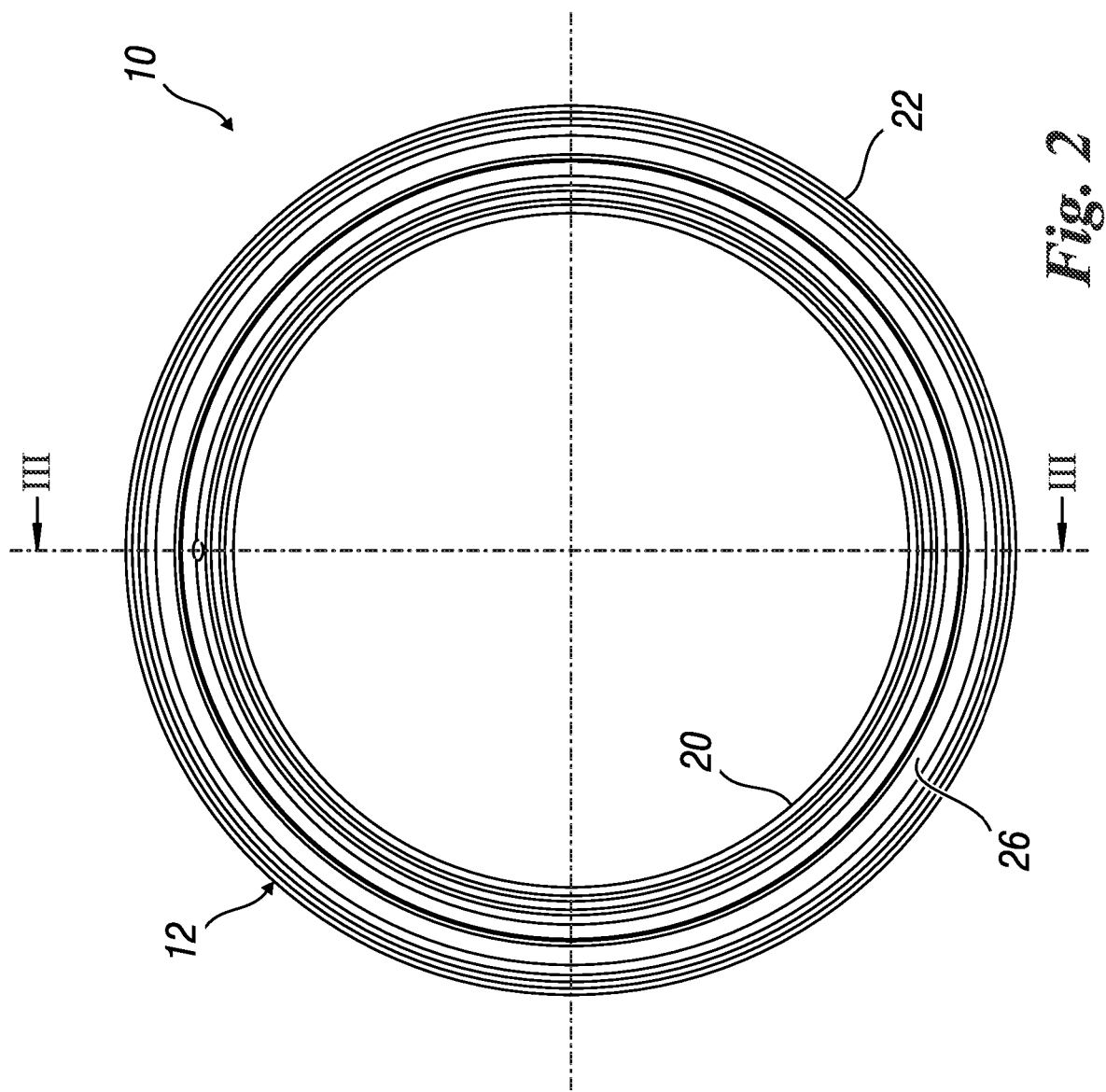
FIG. 2 is a side elevation view of the wheel rim structure of FIG. 1.
Figure 3:
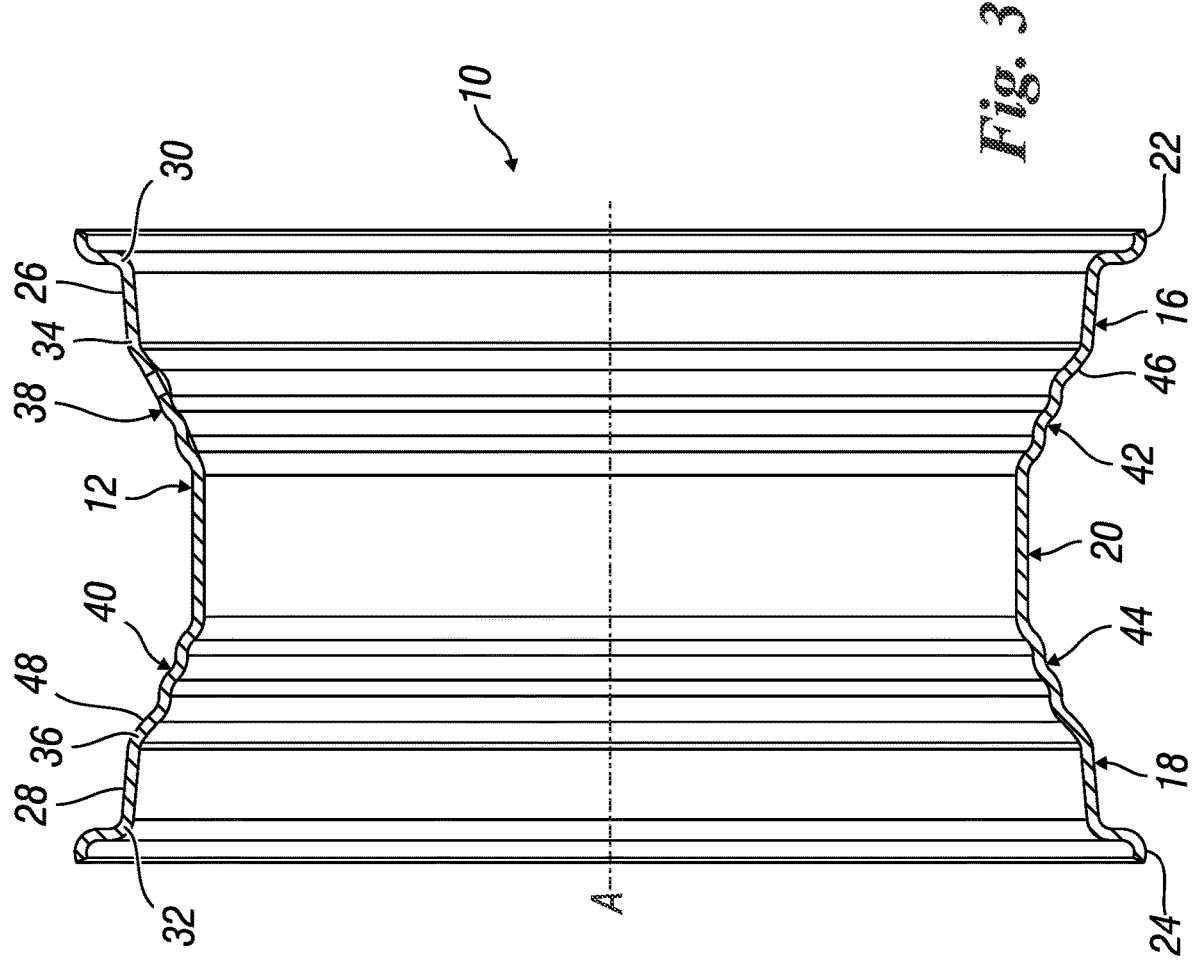
FIG. 3 is a sectional view, obtained along the line III-Ill of FIG. 2, of the wheel rim structure of FIG. 1.

As shown for example in FIG. 3 and with reference to the position of the wheel rim 10 on the hub H of the vehicle, the peripheral structure 12 comprises an axially inner portion 16, an axially outer portion 18 and a central portion 20. The central portion 20 of the peripheral structure 12 is interposed between the axially inner portion 16 and the axially outer portion 18 of said peripheral structure 12.

The central portion 20 of the peripheral structure 12 comprises a circumferential well, in the area of which the radius of the wheel rim 10 is minimum. Each of the axially inner portion 16 and the axially outer portion 18 of the peripheral structure 12 comprises, in sequence and starting from an outer edge of the wheel rim 10, a respective peripheral flange 22, 24, a connecting wall 26, 28 and a connecting part 38, 40.

Each connecting wall 26, 28 of the axially inner portion 16 and the axially outer portion 18 of the peripheral structure 12 joins to a respective peripheral flange 22, 24 and extends axially towards the central portion 20 of the peripheral structure 12. Each connecting wall 26, 28 is substantially frustoconical and has a first axial end 30, 32 with greater radius, which is joined to a respective peripheral flange 22, 24, and a second axial end 34, 36 with lesser radius, which faces the central portion 20 of the peripheral structure 12. Each connecting wall 26, 28, together with the respective peripheral flange 22, 24, therefore forms a seat for receiving the bead of the tire T.

Each connecting part 38, 40 of the axially inner portion 16 and the axially outer portion 18 of the peripheral structure 12 is interposed between a respective connecting wall 26, 28 and the central portion 20 of said peripheral structure 12. The connecting part 38, 40 of at least one of the axially inner portion 16 and the axially outer portion 18 of the peripheral structure 12 comprises a first curved region 42, 44 which joins with the central portion 20 of said peripheral structure 12.

This first curved region 42, 44 preferably comprises, in a per se known manner, a first concave surface 56, a second concave surface 58 and a third concave surface 60 axially spaced, interspersed with two respective convex surfaces 62, 64. The three concave surfaces 56, 58 and 60 and the two respective convex surfaces 62, 64 extend circumferentially when seen from the side of the wheel rim 10 on which the tire T is fitted. However, this first curved region 42, 44 can comprise curved, concave and/or convex surfaces different from those according to the prior art.

If the first curved region 42, 44 comprises the aforementioned three concave surfaces 56, 58 and 60, it is possible to identify an angle α between a plane P perpendicular to the first axis A and a line L that passes tangentially, on the side of the wheel rim 10 on which the tire T is fitted, through an inflection point between two concave adjacent surfaces 56, 58 and 60. Preferably, this angle α is greater than 45°.

Figure 5:
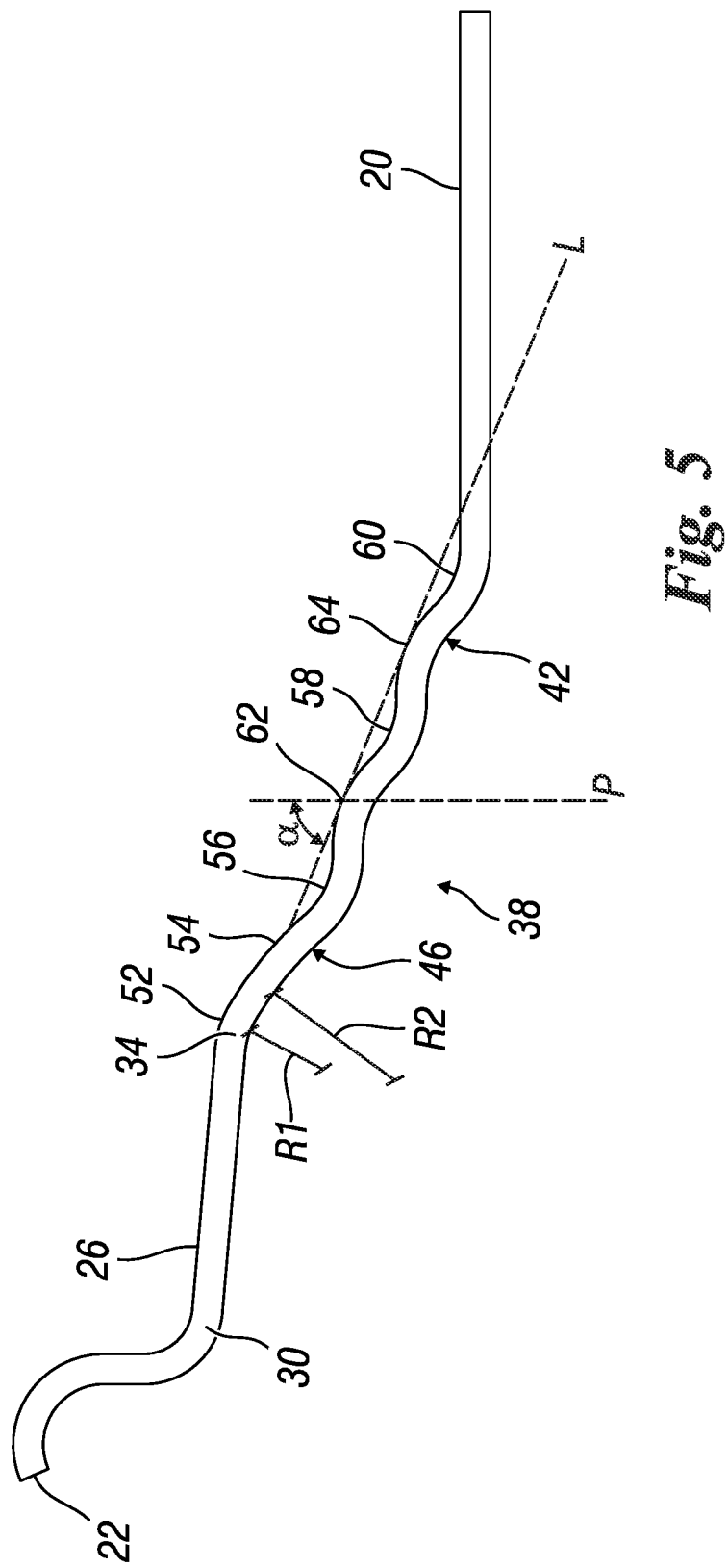
FIG. 5 is an enlarged sectional view of a detail of the wheel rim structure of FIG. 1.

Regardless of the shape of the first curved region 42, 44, the connecting part 38, 40 which comprises said first curved region 42, 44 further comprises a second curved region 46, 48 with wide radius, which is interposed between the respective first curved region 42, 44 and the second axial end 34, 36 with lesser radius than the respective connecting wall 26, 28. According to the disclosure, with reference in particular to FIG. 5, this second curved region 46, 48 with wide radius has a convex profile, when seen from the side of the wheel rim 10 on which the tire T is fitted, and comprises:

a first curved surface 52, which is joined to the second axial end 34, 36 with lesser radius of the respective connecting wall 26, 28 and which has a first radius of curvature R1; and a second curved surface 54, which is interposed between the first curved surface 52 and the first curved region 42, 44 and which has a second radius of curvature R2.

Advantageously, the second radius of curvature R2 of the second curved surface 54 is different from the first radius of curvature R1 of the first curved surface 52.

According to an aspect of the present disclosure, the second radius of curvature R2 of the second curved surface 54 is greater than the first radius of curvature R1 of the first curved surface 52. Again preferably, with reference to the embodiment of the wheel rim 10 shown in the figures, the first radius of curvature R1 has a value ranging from 10 mm to 20 mm, while the second radius of curvature R2 has a value ranging from 40 mm to 80 mm. Even more preferably, the second radius of curvature R2 has a value ranging from 50 mm to 70 mm.

In the embodiment shown in the attached figures, the wheel rim 10 is symmetrical with respect to a second axis B perpendicular to the first axis A which substantially coincides with the axis of the hub H. As shown in FIG. 4, this second axis B passes through the centre-line of the central portion 20 of the peripheral structure 12 of the wheel rim 10.

The second curved region 46, 48 with wide radius of the wheel rim 10 according to the present disclosure guarantees a better structural resistance of the wheel rim 10 with respect to the similar wheel rims of standard type. The advantages of this new wheel rim structure for motor-vehicles are multiple.

For example, when the second curved region 46, 48 with wide radius is obtained on the wheel rim 10 to replace a corresponding rectilinear profile of conventional type, this second curved region 46, 48 with wide radius helps to reduce the inflation time of the tire T during fitting on the wheel rim 10. Actually, it should be pointed out that, prior to inflation, the bead of the tire T is in a slightly offset position with respect to the connecting wall 26, 28 (which is the wall that forms the seat for the bead of the tire T). More precisely, prior to inflation, the bead of the tire T is slightly offset towards the centre-line of the wheel rim 10 instead of being already in position in its seat (consisting of the connecting wall 26, 28). During the inflation phase, therefore, the bead of the tire T shifts towards its seat, facilitated by a specific lubricating substance spread on at least part of the peripheral structure 12 of the wheel rim 10.

Figure 8A:
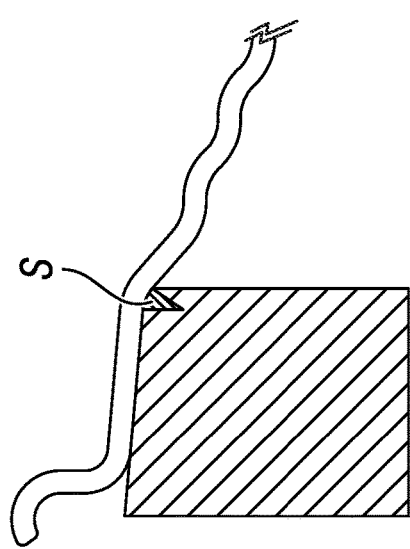
FIGS. 8A and 8B show respectively, in section, an enlarged view of a detail of a wheel rim structure according to the prior art and according to the present disclosure.

Consequently, in wheel rims of a known type, which are provided with a rectilinear profile of conventional type (shown in FIG. 8A), a pointed angle is formed between the seat of the bead of the tire T and the respective adjacent connecting wall. For this reason, when the bead of the tire T "shifts" during inflation, it must overcome this pointed angle, which can generate blockages of at least part of the bead of the tire T. Vice versa, in the wheel rim 10 according to the present disclosure, which is provided with the second curved region 46, 48 with wide radius (highlighted in FIG. 5), during inflation the bead of the tire T can easily shift along the profile of the peripheral structure 12 of the wheel rim 10, facilitated by the lubricating substance, thus avoiding any blockages that may occur in the presence of a pointed angle.

Figure 6A:
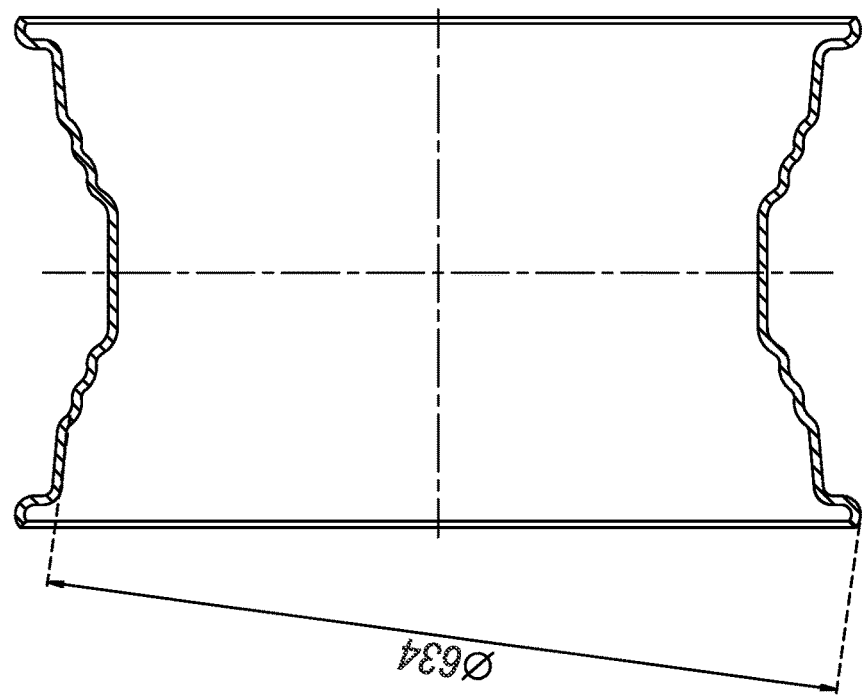
FIGS. 6A and 6B show respectively, in section, a wheel rim structure according to the prior art and according to the present disclosure.
Figure 6B:
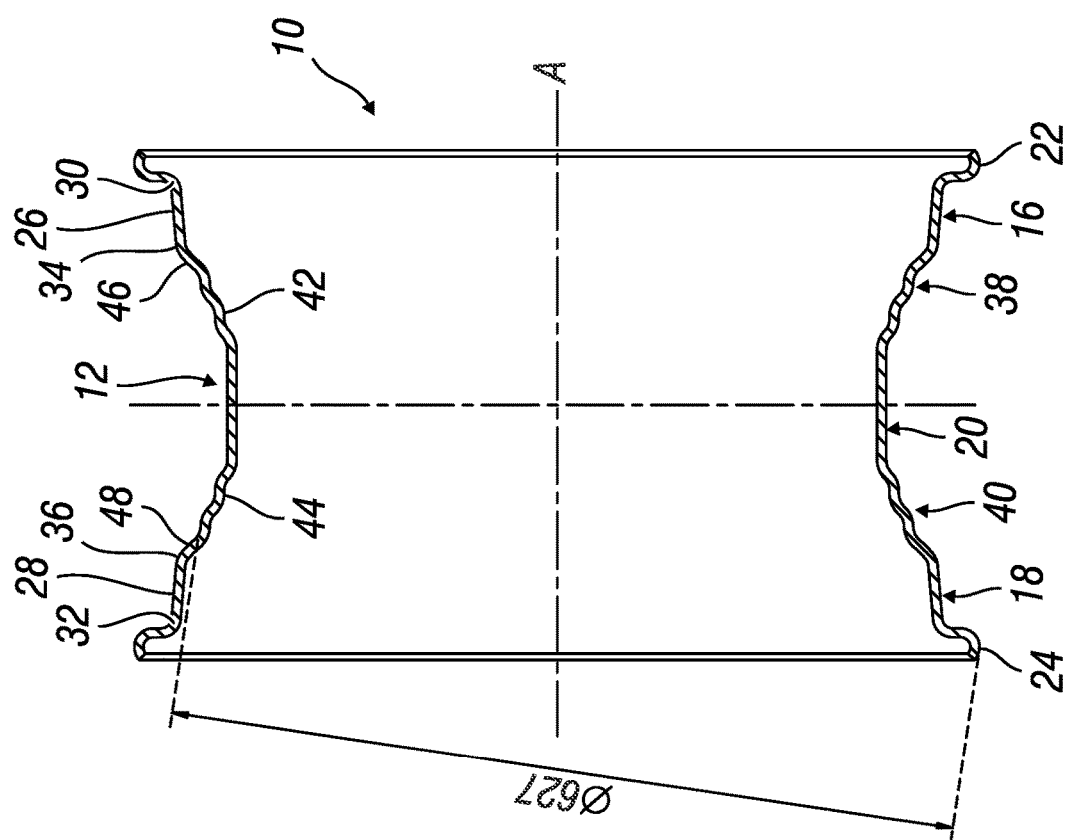

Another advantage of the wheel rim structure for motor-vehicles according to the present disclosure consists in a different "depth", understood as distance from the lateral edge of the wheel rim 10, of the second curved region 46, 48 with wide radius with respect, for example, to a profile according to the prior art. As shown in FIG. 6A (which illustrates a profile according to the prior art) and 6B (which illustrates the wheel rim structure for motor-vehicles according to the present disclosure), the diagonal measurement of the diameter, which in practice coincides with the measurement of the stretching of the tire T, is smaller in the wheel rim structure for motor-vehicles according to the present disclosure than in the profile of the standard wheel rim. The wheel rim structure for motor-vehicles according to the present disclosure therefore requires less effort to fit the tire T on the wheel rim 10, making the fitting procedure simpler and quicker.

Figure 7A:
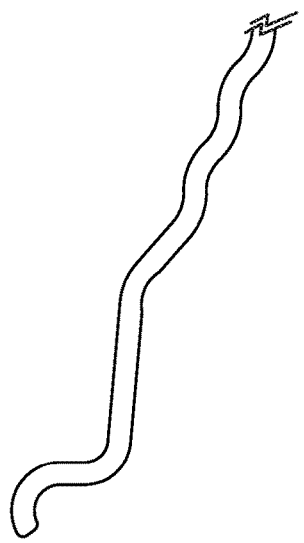
FIGS. 7A and 7B show respectively, in section, a phase of the formation process of a wheel rim structure according to the prior art and according to the present disclosure.
Figure 7B:
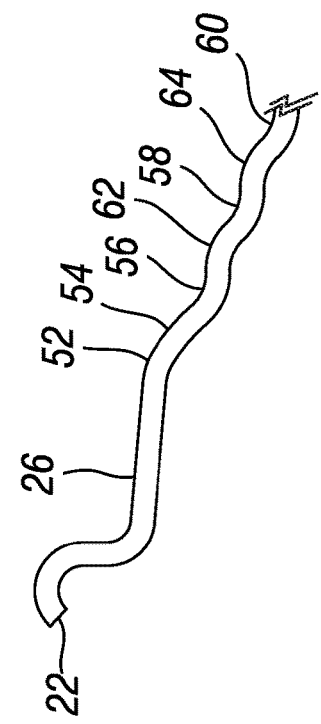
Figure 8B:
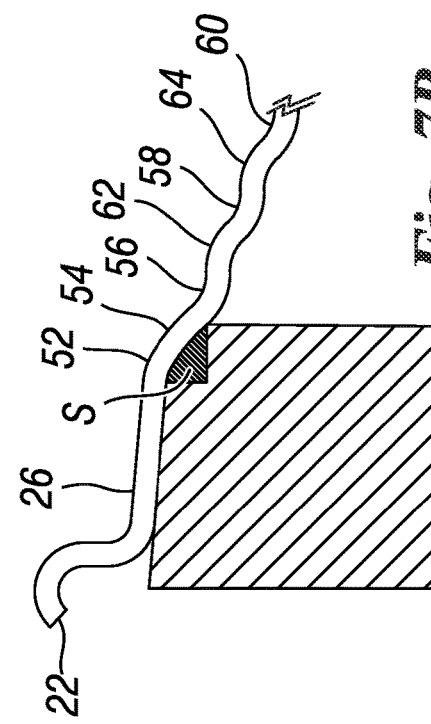

Lastly, the wheel rim structure for motor-vehicles according to the present disclosure also allows improvement of the process of formation of the wheel rim 10. As highlighted in FIGS. 7A and 7B, when the second curved region 46, 48 with wide radius (highlighted in FIG. 5) is obtained on the wheel rim 10 to replace a corresponding rectilinear profile of conventional type, the tool for forming the wheel rim 10, used in the formation process of the wheel rim 10, has a greater contact surface (indicated by S in FIGS. 7A and 7B) on the surface of the peripheral structure 12 of the wheel rim 10. A greater contact surface, in addition to avoiding the formation of the above-mentioned pointed angle, with all the resulting drawbacks, prolongs the life of the forming tool of the wheel rim 10 and reduces wear on it.

A greater contact surface also makes the process of formation of the wheel rim 10 more stable. This means that the wheel rim 10, when it rotates during the formation process, reduces the risk of generating vibrations, which in turn benefits the quality analyses such as, for example, control of the geometric uniformity of the wheel rim in the radial direction (necessary to counter the phenomenon of radial run-out), which are carried out subsequently.

It is thus seen that the wheel rim structure for motor-vehicles according to the present disclosure achieves the objects previously highlighted.

The wheel rim structure for motor-vehicles of the present disclosure thus conceived is subject in any case to numerous modifications and variations, all falling within the same inventive concept; furthermore, all the details can be replaced by technically equivalent elements. In practice any materials, shapes and dimensions can be used, according to technical requirements.

The scope of protection of the disclosure is therefore defined by the attached claims.

The invention claimed is:

1. A wheel rim for motor-vehicles comprising:
   a peripheral structure that extends circumferentially around a predefined first axis, said peripheral structure being arranged to receive a tire; and
   a central structure, integrated with said peripheral structure and provided with means for coupling, along said first axis, with a hub of the motor-vehicle,
   wherein said peripheral structure comprises an axially inner portion, an axially outer portion and a central portion, interposed between said axially inner portion and said axially outer portion, wherein said central portion comprises a circumferential well, where the radius of the wheel rim is minimum, wherein said wheel rim is symmetrical with respect to a second axis perpendicular to said first axis and passing through a centre-line of said central portion, and wherein each of said axially inner portion and said axially outer portion comprises in sequence:
   a respective peripheral flange;
   a respective connecting wall, which joins the respective peripheral flange and extends axially towards said central portion, wherein the respective connecting wall is substantially frustoconical and has a first axial end with greater radius, the first axial end joined to the respective peripheral flange, and a second axial end with lesser radius, the second axial end disposed opposite the first axial end and facing said central portion, and wherein the respective connecting wall, together with the respective peripheral flange, forms a seat for receiving the bead of said tire;
   a connecting part, which is interposed between the respective connecting wall and said central portion,
   wherein the connecting part of at least one of said axially inner portion and said axially outer portion comprises a first curved region which connects with said central portion,
   the connecting part which comprises said first curved region, further comprises a second curved region which is interposed between said first curved region and the second axial end with lesser radius of the respective connecting wall, said first curved region comprising:
   a first concave surface, a second concave surface, and a third concave surface which are axially spaced, interspersed with two respective convex surfaces, said concave surfaces and said two convex surfaces extending circumferentially when seen from the side of the wheel rim on which said tire is fitted;
   said second curved region having a convex profile when seen from the side of the wheel rim on which said tire is fitted, said second curved region comprising:
   a first curved surface, which is joined to the second axial end with lesser radius of the respective connecting wall, the first curved surface having a first radius of curvature; and
   a second curved surface, which is interposed between said first curved surface and said first concave surface of the first curved region such that the second curved surface separates the first curved surface from the first concave surface, the second curved surface having a second radius of curvature different from said first radius of curvature such that the second curved region includes different curvatures between the first curved surface and the second curved surface.

2. The wheel rim according to claim 1, wherein the second radius of curvature of said second curved surface is greater than the first radius of curvature of said first curved surface.

3. The wheel rim according to claim 2, wherein said first radius of curvature has a value comprised between 10 millimeters (mm) and 20 millimeters (mm).

4. The wheel rim according to claim 2, wherein said second radius of curvature has a value comprised between 40 millimeters (mm) and 80 millimeters (mm).

5. The wheel rim according to claim 2, wherein said second radius of curvature has a value comprised between 50 millimeters (mm) and 70 millimeters (mm).

6. The wheel rim according to claim 1, wherein between a plane perpendicular to said first axis and a line passing tangentially through an inflection point between two adjacent concave surfaces, on the side of the wheel rim on which said tire is fitted, an angle greater than 45 degrees is formed.

7. The wheel rim according to claim 3, wherein said second radius of curvature has a value comprised between 40 millimeters (mm) and 80 millimeters (mm).

8. The wheel rim according to claim 3, wherein said second radius of curvature has a value comprised between 50 millimeters (mm) and 70 millimeters (mm).

9. A wheel rim for motor-vehicles comprising:
- a peripheral structure that extends circumferentially around a first axis and arranged to receive a tire; and
- a central structure integrated with said peripheral structure and provided with means for coupling with a hub of the motor-vehicle;
- wherein said peripheral structure comprises an axially inner portion, an axially outer portion and a central portion, interposed between said axially inner portion and said axially outer portion, wherein said central portion comprises a circumferential well, where the radius of the wheel rim is minimum, wherein said wheel rim is symmetrical with respect to a second axis perpendicular to said first axis and passing through a centre-line of said central portion;
- wherein each of said axially inner portion and said axially outer portion comprises in sequence:
- a respective peripheral flange;
- a respective connecting wall, which joins the respective peripheral flange and extends axially towards said central portion, wherein the respective connecting wall is substantially frustoconical and has:
  - a first axial end with greater radius, which is joined to the respective peripheral flange; and
  - a second axial end with lesser radius, which faces said central portion, and wherein the respective connecting wall, together with the respective peripheral flange, forms a seat for receiving a bead of said tire;
- a connecting part interposed between the respective connecting wall and said central portion, wherein the connecting part of at least one of said axially inner portion and said axially outer portion comprises a first curved region which connects with said central portion, the connecting part comprises said first curved region and a second curved region interposed between said first curved region and the second axial end with lesser radius of the respective connecting wall;
- wherein said first curved region comprises a first concave surface, a second concave surface, and a third concave surface which are axially spaced, interspersed with two respective convex surfaces, said concave surfaces and said two convex surfaces extending circumferentially from the side of the wheel rim on which said tire is fitted;
- wherein said second curved region includes a convex profile from the side of the wheel rim on which said tire is fitted, said second curved region comprises:
  - a first curved surface joined to the second axial end with lesser radius of the respective connecting wall, said first curved surface has a first radius of curvature; and
  - a second curved surface interposed between said first curved surface and said first curved region, said second curved surface has a second radius of curvature different from said first radius of curvature, wherein said second radius of curvature of said second curved surface has a value comprised between 40 millimeters (mm) and 80 millimeters (mm), which is greater than the first radius of curvature of said first curved surface.

\* \* \* \* \*